United States Patent [19]

Parker

[11] 4,309,162
[45] Jan. 5, 1982

[54] ICE CREAM DISPENSER

[76] Inventor: Frank W. Parker, 311 Stoneybrook Dr., Lexington, Ky. 40503

[21] Appl. No.: 190,538

[22] Filed: Sep. 24, 1980

[51] Int. Cl.³ .......................... B29C 1/00; B29D 3/00
[52] U.S. Cl. ................................. 425/126 S; 141/98; 222/386; 425/286
[58] Field of Search .................... 425/126 S, 286, 117, 425/118; 221/96; 222/387, 322, 386, 393; 141/249, 98; 426/421, 512; 269/254 R; 294/875 H

[56] References Cited

U.S. PATENT DOCUMENTS

| 2,095,187 | 10/1937 | Grandbouche | 222/387 |
| 2,173,850 | 9/1939 | Lockwood | 426/421 |
| 2,175,324 | 10/1939 | Stamp | 426/421 |
| 2,731,174 | 1/1956 | Vogelsong | 222/322 |
| 2,894,652 | 7/1959 | Glass | 425/126 S |
| 2,998,784 | 9/1961 | Glass | 425/126 S |

FOREIGN PATENT DOCUMENTS

| 42791 | 2/1929 | Denmark | 425/286 |
| 1047222 | 12/1958 | Fed. Rep. of Germany | 425/126 S |

Primary Examiner—Willard E. Hoag
Attorney, Agent, or Firm—Beveridge, DeGrandi, Kline & Lunsford

[57] ABSTRACT

An ice cream dispenser having a barrel for forming a bar of ice cream therewithin on insertion thereof into bulk ice cream, keeper means for receiving and positioning a stick within the barrel thereof for formation of a bar of ice cream thereabout and with such stick extendant outwardly from one of such ice cream bar, and a plunger for ejection of a bar of ice cream on a stick from the barrel.

11 Claims, 11 Drawing Figures

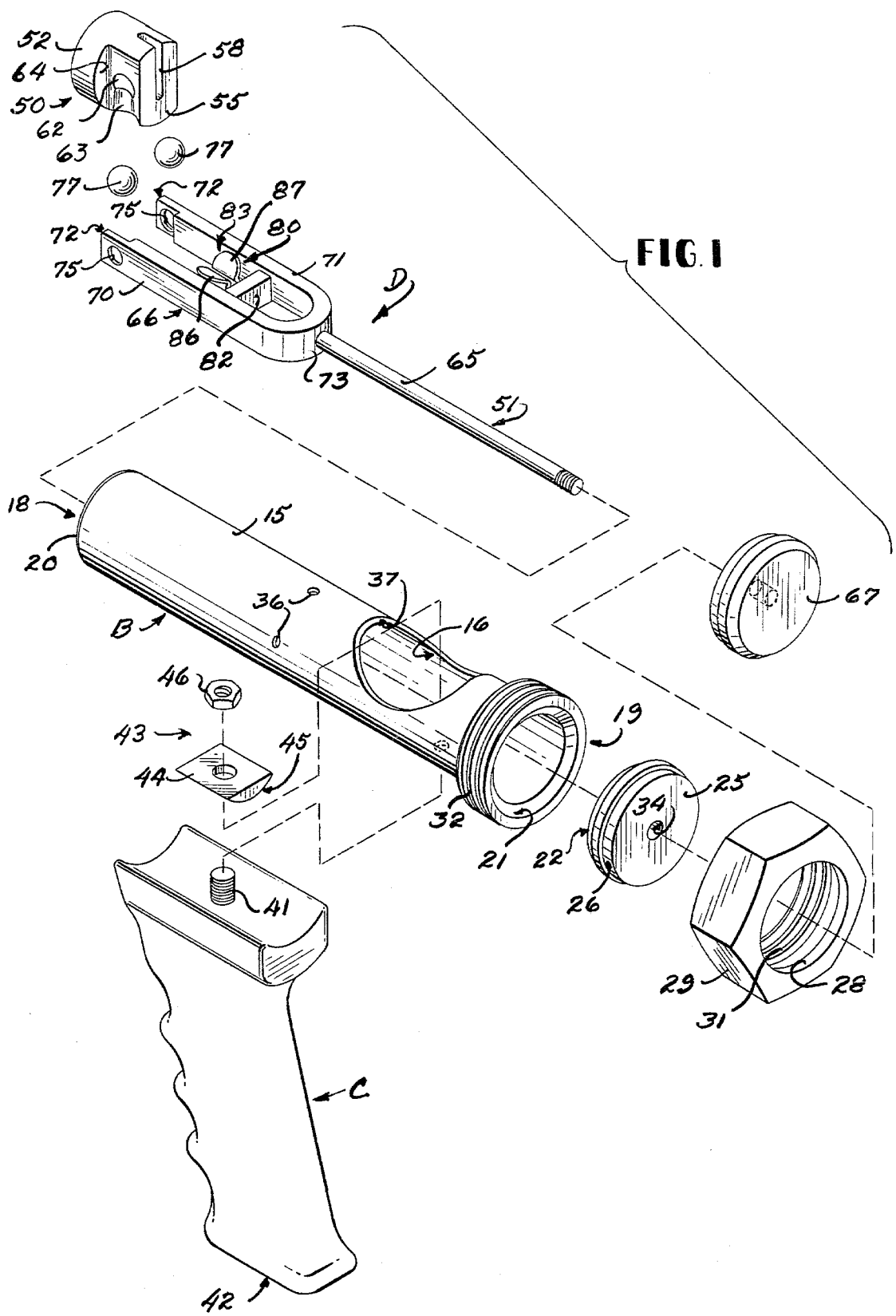

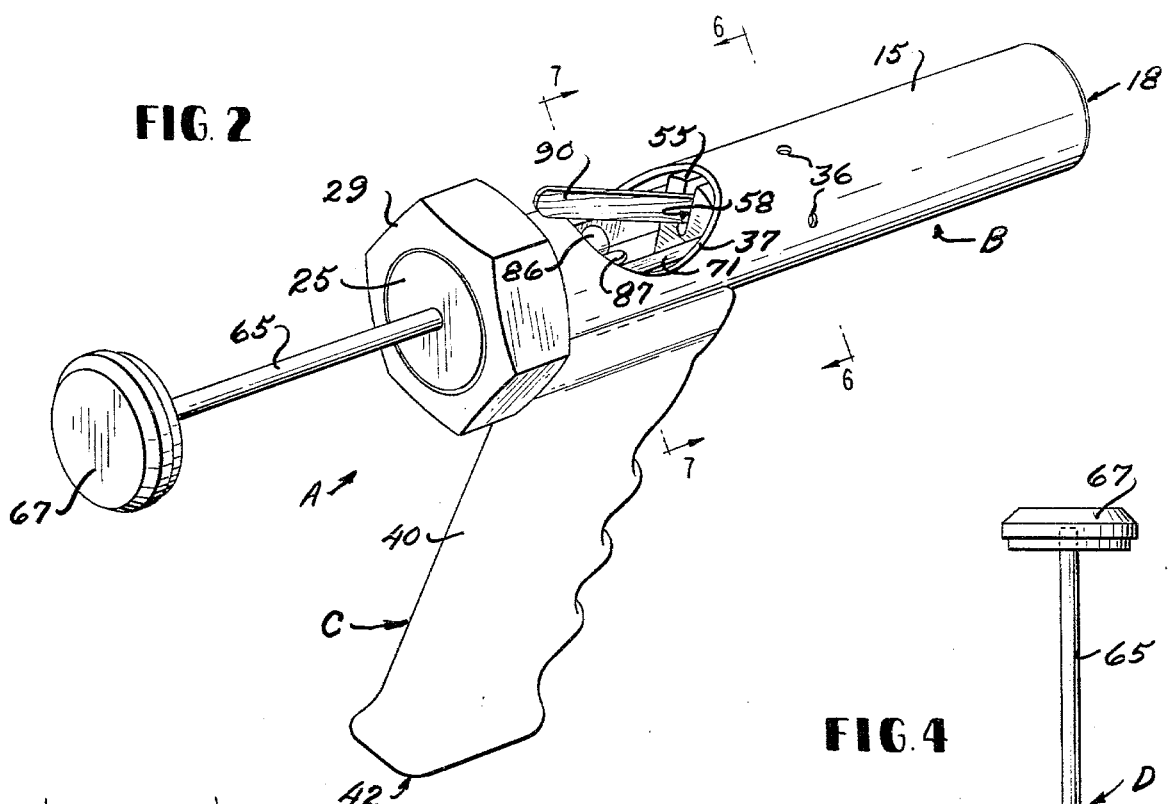
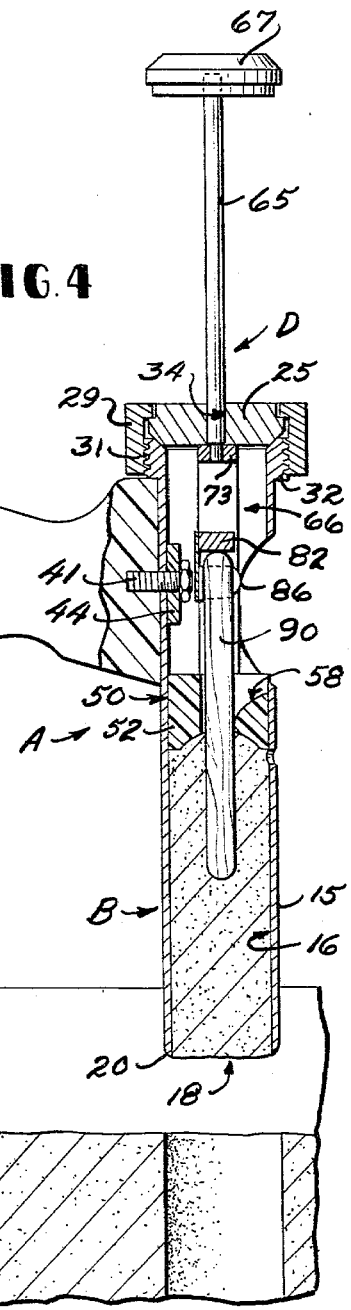
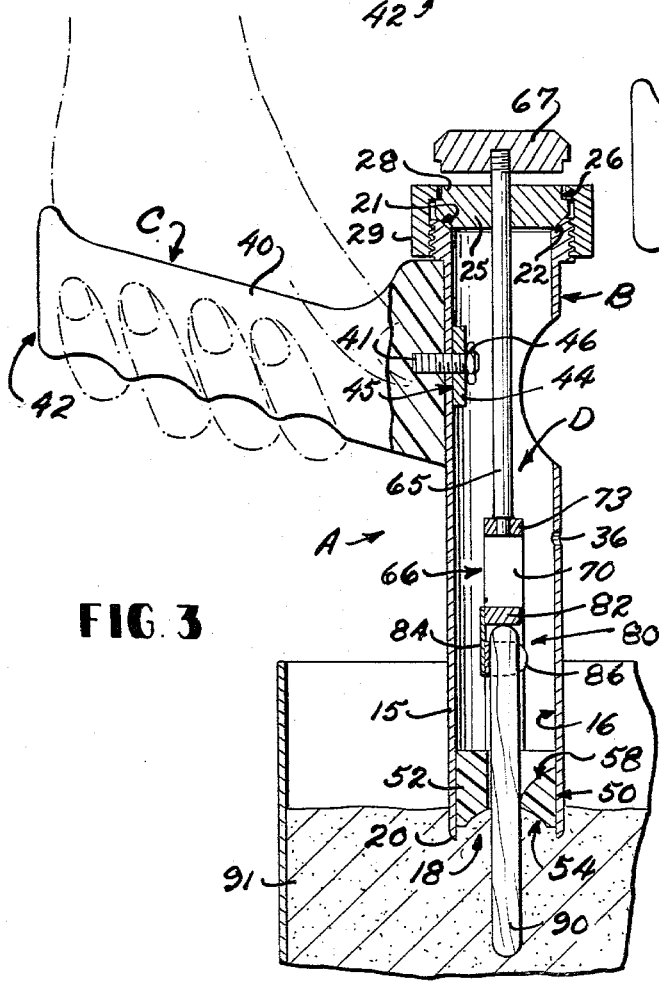

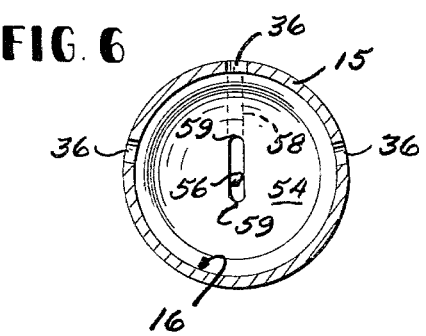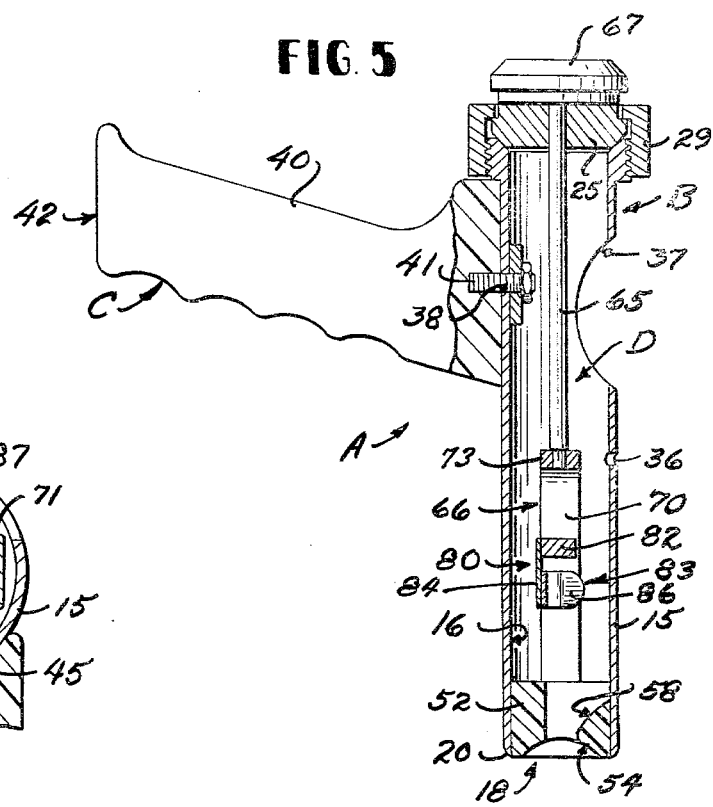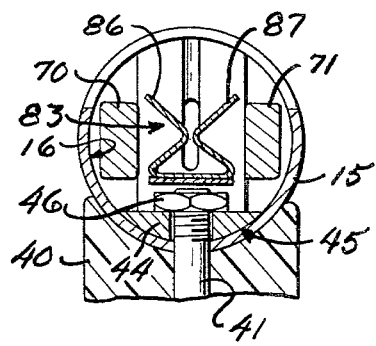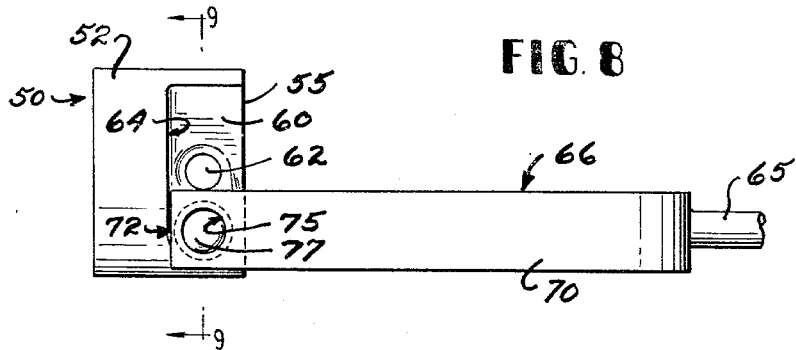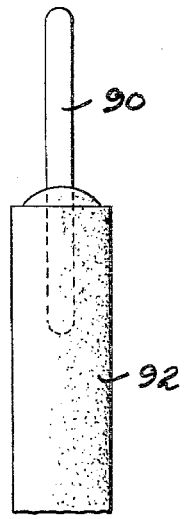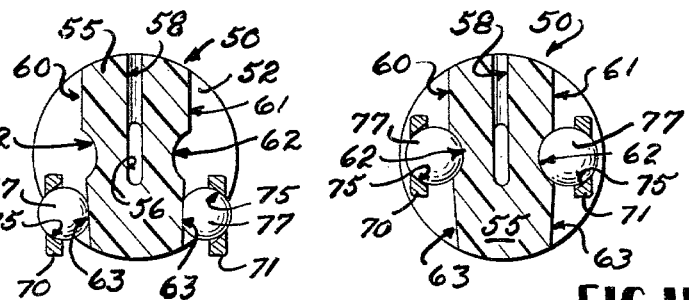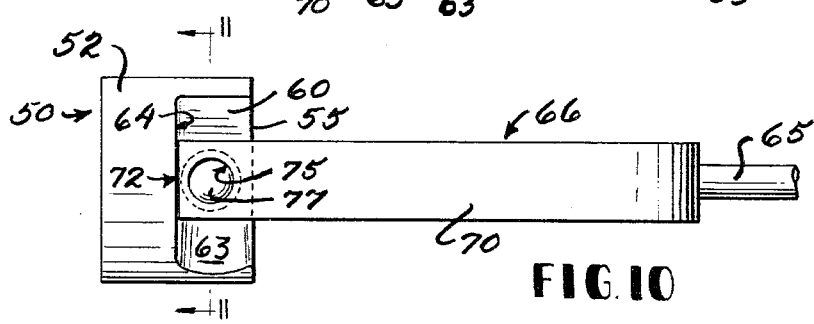

ICE CREAM DISPENSER

BACKGROUND OF THE INVENTION

This invention relates to improvements in ice cream dispensers of the type for forming and shaping bulk ice cream as a bar of ice cream on a stick.

I recognize that others have previously provided various devices for dispensing bulk ice cream in the shape of a bar, ball, or other configuration and into which a stick may thereafter be inserted. For instance, the "Ice Cream Form Device" of U.S. Pat. No. 1,757,799, which shows and describes an ice cream scoop for dispensing bulk ice cream in the form of a bar of ice cream, and into which a stick may then be inserted; and the "Ice Cream Disher" of U.S. Pat. No. 1,888,739, which shows and describes a tonglike device for dispensing bulk ice cream in the form of a ball, and which includes a funnel-like guide through which a stick may then be inserted into the ice cream ball.

Others have also previously provided pistol-like scoops for dispensing bulk ice cream in various forms, for instance, as shown in U.S. Pat. Nos. 1,595,393 and 3,822,976.

However, as far as I am aware, no one has heretofore provided an ice cream dispenser which receives and positions a stick in a bar of ice cream as the same is shaped and formed by the dispenser.

Of course, when a stick is inserted into a preformed bar or ball of ice cream, the path of insertion creates a channel through which the stick may slip right back out. This is in contradistinction to the present invention of forming ice cream about the stick, in a manner such that the ice cream fills the various irregularities and interstices of the stick and thus securely anchors the same within the ice cream bar.

Also, many prior devices for dispensing bulk ice cream are of a construction that does not meet present health regulations, such as those relating to specifications for parts of food serving implements and ease of disassembly for purposes of cleaning the same.

BRIEF SUMMARY OF THE INVENTION

The primary object of this invention is the provision of an ice cream dispenser which shapes and forms an ice cream bar on a stick as the dispenser is inserted into a container of bulk ice cream. Of course, ice cream could be introduced into my improved dispenser other than by insertion of the same into a container of bulk ice cream, such as by way of scooping or otherwise placing ice cream therein, but it is believed that the usual manner of use of the same will be by way of insertion thereof into a bulk ice cream container, and the same is thus shown and described as it is conventionally intended to be used.

A further object of the invention is the provision of an ice cream dispenser having parts and an assembly thereof which meet health regulations.

A still further object is the provision of an ice cream dispenser that is practical for commercial use in forming an ice cream bar on a stick. That is, one in which the ice cream bar may be formed on a stick as a single operation, and wherein the stick is of substantially uniform positioning within the ice cream bar and as extending therefrom on each operation thereof.

Other objects and advantages of the invention will become apparent from the following detailed description, taken in connection with the accompanying drawings, and in which drawings:

BRIEF DESCRIPTION OF THE DRAWINGS

FIG. 1 is an exploded perspective of my improved ice cream dispenser.

FIG. 2 is a perspective view thereof and showing a stick being placed therewithin.

FIGS. 3, 4, and 5 are partial longitudinal sectional views thereof, and show respective steps of initial insertion of my dispenser into bulk ice cream, formation thereby of a bar of ice cream on a stick, and ejection therefrom of an ice cream bar on a stick.

FIGS. 6 and 7 are enlarged transverse sectional views as respectively taken substantially along lines 6—6 and 7—7 of FIG. 2.

FIG. 8 is a fragmentary view showing the initial step in attachment of the rod means of my improved ice cream dispenser to the piston means thereof.

FIG. 9 is a transverse sectional view taken substantially on the line 9—9 of FIG. 8.

FIG. 10 is a fragmentary side elevation showing the rod means of my improved ice cream dispenser as attached to the piston means thereof.

FIG. 11 is a transverse sectional view taken substantially on the line 11—11 of FIG. 10.

DETAILED DESCRIPTION OF THE INVENTION

In the drawings, wherein is shown a preferred embodiment of the invention, and wherein similar reference characters designate corresponding part throughout the several views, the letter A may generally designate my improved ice cream dispenser, which preferably includes barrel means B, handle means C, and plunger means D.

As shown, dispenser A is preferably constructed in the nature of a pistol-like device, which I have found facilitates operation thereof. Thus, as a convenient means of description, some parts thereof have been described in terms of well-known pistol nomenclature. Of course, it is to be understood that my invention is not limited to the particular pistol-like configuration thereof as shown and described.

Barrel means B preferably comprises an elongated cylinder 15 defining an elongated chamber or bore 16 therethrough, having an open muzzle end 18 and an open back end 19. It is obvious that barrel means B and bore 16 thereof may be other than cylindrical, for instance as oblate or elliptical, for forming ice cream bars of such cross sectional configuration as may be desired.

Muzzle end 18 of cylinder 15 may have an outwardly angled chamfer 20 to facilitate insertion of muzzle end 18 into frozen bulk ice cream.

Back end 19 of cylinder 15 may have an inwardly angled chamfer 21 which mates with chamfer 22 of insert disc 25.

Insert disc 25 may have a peripherally extending grooved portion 26 on the face thereof opposite chamfer 22, within which may be received internally extending flange 28 of lock nut 29.

Lock nut 29 may have internal threads 31, for interconnection with peripheral threads 32 of cylinder 15 in attachment of lock nut 29 and insert disc 25 as a removable closure on back end 19 of cylinder 15.

Disc 25 is preferably provided with a centrally disposed opening 34, for cooperation with plunger means D, as will be subsequently described.

Cylinder 15 is preferably provided with a plurality of orifices 36 opening therethrough and into bore 16 intermedially the length thereof; and a breech 37 which opens into bore 16 adjacent back end 19 thereof, all for purposes as will be subsequently described.

Cylinder 15 may also be provided with a shaft receiving opening 38, substantially opposite breech 37, for attachment of handle means C to barrel means B, as will be subsequently described.

Handle means C preferably comprises a pistol grip-type stock 40, having a threaded shaft 41 at the end thereof opposite butt end 42. In interconnection of handle means C to barrel means B, threaded shaft 41 is inserted through opening 38 of cylinder 15 to within bore 16 thereof and fastener means 43 is attached thereto. Fastener means 43 may include a washer 44, having a semicylindrical face 45, of a diameter to closely confront the inner diameter of cylinder 15, and a nut 46.

Plunger means D preferably includes piston means 50 and rod means 51.

Piston means 50 may have a cylindrical body portion 52, the periphery of which slidably confronts against the inner diameter of cylinder 15. Cylindrical body portion 52 may have an at least partially concave head 54 fronting toward muzzle end 18 of cylinder 15, a shank 55; an oblate aperture 56 opening centrally through head 54 thereof; and a guideway slot 58 opening into aperture 56 from the side and shank 55 thereof, all for purposes as will be subsequently described.

Aperture opening 56 is preferably provided with radial extremities 59 in compliance thereof with health regulations.

Shank 55 of piston means 50 is preferably provided with spaced apart land portions 60 and 61 to each side thereof. Land portions 60 and 61 are each provided with a hemispherical socket 62 as axially positioned on a common line of center therebetween, and which line of center intersects the axis of cylindrical body portion 52 of piston means 50; a slideway 63 which opens from one end thereof and into the hemispherical socket 62 thereof; and a shoulder portion 64, for purposes as will be subsequently described.

Rod means 51 preferably includes an elongated shaft 65 having a bifurcated member 66 attached to one end thereof and a knob 67 attached to the other end thereof. As shown, shaft 65 is slidably supported in and positioned as extending through opening 34 of insert disc 25, knob 67 being attached to the end thereof extending outwardly of barrel means B, for manual reciprocation of piston means 50, bifurcated member 66 thereof being positioned within bore 16 of cylinder 15 and to which piston means 50 is attached.

Bifurcated member 66 may comprise a pair of spaced apart parallel branch members 70 and 71, having terminus ends 72 and a bight portion 73 to which shaft 65 may be attached.

Branch bars 70 and 71 are preferably spaced apart in a manner so that branch 70 confronts land portion 60 of piston means 50 and branch 71 confronts land portion 61 thereof.

Branch bars 70 and 71 are each provided with a hemispherical socket 75 adjacent terminus ends 72 thereof, for juxtaposed axial alignment with the hemispherical socket 62 of respective confronting land portions 60 and 61.

Compressible ball means 77 are provided for removable attachment of rod means 51 to piston means 50.

In attachment of rod means 51 to piston means 50, a compressible ball means 77 is socketed within each hemispherical socket 75 of branch bars 70 and 71, and shank 55 of piston means 50 is placed therebetween so that the ball means 77 of socket 75 of branch bar 70 is in slideway 63 of land portion 60 and ball means 77 of socket 75 of branch bar 71 is in slideway 63 of land portion 62, as shown in FIGS. 8 and 9. Shank 55 of piston means 50 is then slid downwardly between branch bars 70 and 71, until each ball means 77 is socketed within respective hemispherical socket 62 of each land portions 60 and 61, as shown in FIGS. 10 and 11, with the terminus ends 72 of branch bars 70 and 71 respectively abutting shoulder 64 of each land portions 60 and 61. In detachment of piston means 50 from rod means 51, by reference to FIG. 10, pressing downwardly on bifurcated member 66 causes ball means 77 to move out of their respective sockets 62 for removal along slideways 63.

Detainment means 80 is preferably mounted on bifurcated member 66, between branch bars 70 and 71 thereof, for receiving and holding one end of a stick, as extendant through slot 58 and aperture 56 of piston means 50, so that the other end thereof may be received and positioned within a bar of ice cream as the same is formed within bore 16 of cylinder 15.

In the mounting of detainment means 80 on bifurcated member 66, a bar 82 may be interconnected between branches 70 and 71 thereof, adjacent bight 73, to which may be attached spring means 83, such as by plate member 84. Spring means 83 may comprise a pair of adjustably spaced apart leaf spring ears 86 and 87 positioned for abutment against opposite sides of an ice cream stick for receiving and holding the same therebetween. Ears 86 and 87 may be selectively positioned closer together, or further apart, dependent upon the size of an ice cream stick to be received therebetween and in frictional ripping thereof as desired.

As shown in FIGS. 3 and 4, spring means 83 is preferably mounted on plate member 84 in spaced apart relation to bar 82 in a manner so that the end of an ice cream stick received by spring means 83 abuts against bar 82, providing keeper means for receiving and positioning an ice cream stick so that the one end thereof extends beyond head 54 of piston means 50 the desired length to within an ice cream bar as the same is formed within bore 16 of cylinder 15 and the other end extends a desired length outwardly from such ice cream bar.

As shown, the length of stroke of piston means 50 within bore 16 of barrel means 15 may be determined by abutment of bight 73 of bifurcated member 66 with insert disc 25 and, in such position of abutment, detainment means 80 is positioned in relation to breech 37 so that one end of an ice cream stick may be easily inserted through breech 37, slot 58 and aperture 56 of piston means 50, and the other end thereof inserted into detainment means 80, as best shown in FIG. 2.

As an alternative, not shown, to regulating the length of stroke of piston means 50 by abutment of bight 63 of bifurcated member 66 with insert disc 25, plate member 84 may extend below bar 82 to a position for abutment with nut 46.

It will be noted that, unless plunger means D is turned to a proper position within barrel means B, then bifurcated end 66 of rod means 51 will abut against some part of fastener means 43, this relationship providing for positioning detainment means 80 to receive one end of a stick as loaded thereinto through breech 37.

The usual manner of operation of my improved ice cream dispenser is as shown in FIGS. 2, 3, 4, and 5. That is, the operator grasps handle means B with one hand and knob 67 with his other hand and fully withdraws plunger means D within barrel means B, releases his hand from knob 67 and inserts one end of an ice cream stick 90 through breech 37 and thence into and through slot 58 and aperture 56 of piston means 50, as shown in FIG. 2, and the other end thereof into detainment means 80. The operator may then grasp knob 67 and push piston means 50 to the muzzle end 18 of barrel means B and insert muzzle end 18 thereof into a container of bulk ice cream 91, as best shown in FIG. 3. When bore 16 of barrel means B is filled with ice cream, barrel means B may be withdrawn from the bulk ice cream 91, as shown in FIG. 4, and the operator may then push knob 67 forward to eject a formed and shaped ice cream bar 92 on stick 90, as shown in FIG. 5.

When barrel means B is thus filled with ice cream, the operator may, as shown in FIG. 4, look through orifices 36 of cylinder 15 to confirm that bore 16 thereof is filled with ice cream.

In some instances it may be desired to insert ice cream dispenser A into bulk ice cream with piston means 50 fully withdrawn into bore 16 of cylinder 15, as shown in FIG. 2. When so used, as ice cream is formed within bore 16 of cylinder 15, then orifices 36 comprise vent means for releasing air from bore 16 as the same is filled with ice cream.

Rod means 51 has herein been shown and described as attached to piston means 50, but it is within the scope of my invention to provide an elongated piston having a head at one end thereof comprising a piston means, the body of the piston extending from the head thereof comprising what I call rod means, and wherein stick detainment means may be provided within or on that portion of the piston which extends from the head thereof.

I have thus provided an ice cream dispenser wherein the portion of chamber 16 as extending from open muzzle end 18 of barrel means B and head 54 of piston means 50 comprise means for forming ice cream into individual portions and which is cooperatively operable with oblate aperture 56 of piston means 50 and detainment means 80, which comprise means for positioning an ice cream stick 90 with at least one end thereof extending into such portion of chamber 16, so that an individual portion of ice cream is formed about the end of stick 90 extending into such portion of chamber 16, one end of stick 90 being thus embedded in an individual portion as the same is formed and, when used as herein shown and described, with a segment of bulk ice cream compacted about one end of stick 90 in forming an ice cream individual portion.

As shown and described, ice cream dispenser A may be readily disassembled so that the parts thereof may be readily cleaned, in accordance with health regulations.

Various changes may be made to the form of the invention herein shown and described without departing from the spirit of the invention or the scope of the following claims.

I claim:

1. An ice cream dispenser including elongated barrel means having an open muzzle end and defining an elongated chamber for receiving and forming ice cream into a bar-like configuration therewithin by insertion of the open muzzle end thereof into bulk ice cream, handle means for facilitating manipulation of said ice cream dispenser, and plunger means operable for reciprocal movement through said chamber, in one direction for filling of said chamber with ice cream, and in the other direction for ejection of a bar of ice cream therefrom, said plunger means including detainment means mounted thereon for receiving and positioning a stick within said chamber in juxtaposition so that one end thereof extends within the ice cream received by said chamber during and on formation thereof as an ice cream bar and with the other end of such stick extendant outwardly from the thus formed bar of ice cream.

2. An ice cream dispenser as specified in claim 1 wherein said plunger means includes piston means and rod means, said piston means including a body portion having a head face fronting toward said open muzzle end of said chamber for forming one end of an ice cream bar as formed within said chamber and a rear face opposite said head face thereof, said body portion of said piston means having a stick receiving aperture opening into and substantially axially of said elongated chamber of said barrel means and said rod means extends axially outwardly from said rear face of said piston means, said detainment means including keeper means and being mounted on said rod means at a spaced apart relation outwardly from said rear face of said piston means for receiving and holding one end of a stick extendant therefrom and through said aperture of said piston means and into said chamber of said barrel means.

3. An ice cream dispenser as specified in claim 2 wherein said barrel means includes a breech opening into said chamber thereof for insertion of a stick through said breech and into said chamber with one end thereof extending through said aperture of said piston means and the other end thereof engaged by said detainment means.

4. An ice cream dispenser as specified in claim 3 wherein said rod means has a bifurcated end attached to said piston means, said detainment means is mounted on said bifurcated end of said rod means and said barrel means includes limit means mounted therewithin and positioned for abutment with said bifurcated end of said rod means in locating said keeper means for receiving a stick inserted through said breech opening.

5. An ice cream dispenser including elongated barrel means having an open muzzle end and defining an elongated chamber for receiving and forming ice cream into a bar-like configuration therewithin by insertion of the open muzzle end thereof into bulk ice cream, handle means for facilitating manipulation of said ice cream dispenser, and plunger means operable for reciprocal movement through said chamber, in one direction for filling of said chamber with ice cream, and in the other direction for ejection of a bar of ice cream therefrom, said plunger means including detainment means for receiving and positioning a stick within said chamber in juxtaposition so that one end thereof extends within the ice cream received by said chamber during and on the formation thereof as an ice cream bar and with the other end of such stick extendant outwardly from the thus formed bar of ice cream, said plunger means including piston means and rod means, said piston means including a body portion having a face fronting toward said open muzzle end of said chamber for forming one end of an ice cream bar as formed within said chamber, said body portion of said piston means having a stick receiving aperture opening into and substantially axially of said elongated chamber of said barrel means and said rod means extends to the side of said body portion of said piston means opposite said face thereof, said rod means including detainment means mounted thereon for receiving and holding one end of a stick extendant therefrom and through said aperture of said piston means and into said chamber of said barrel means.

6. An ice cream dispenser as specified in either of claims 5 or 20 wherein said body portion of said piston means includes a shank portion at the end thereof opposite said face thereof fronting toward said open muzzle end of said barrel means, said shank having spaced apart land portions to each side thereof for attachment thereto of said rod means, said land portions each including a hemispherical socket as axially positioned on a common line of center therebetween and which line of center intersects the axis of said body portion of said piston means, said rod means having a bifurcated end for attachment thereof to said piston means, said bifurcated end including a pair of spaced apart branch bars which each confront one said land portions of said shank of said piston means, each said branch bar of said bifurcated end including a hemispherical socket disposed for axial alignment with the hemispherical socket of said one of said land portions confronting the same when said rod means is attached to said piston means, and ball means socketed within the hemispherical socket of each said branch bars of said bifurcated end and the hemispherical socket of said one of said land portions of said shank of said piston means confronting the same for releasable interconnection of said piston means to said rod means.

7. An ice cream dispenser as specified in claim 6 wherein said ball means are compressible and each said land portions include a slideway opening front one end of said shank and into said hemispherical socket thereof for facilitating the socketing of said compressible ball means within said hemispherical socket of each said branch bars of said bifurcated end and said hemispherical socket of said one of said land portions of said shank of said piston means confronting the same.

8. An ice cream dispenser as specified in claim 2 or 5 wherein said barrel means includes a breech opening into said chamber thereof and to said detainment means of said plunger means for insertion of a stick therethrough and into said detainment means.

9. An ice cream dispenser as specified in either of claims 7 or 8 and including limit means for locating said detainment means to receive a stick as inserted through said breech opening.

10. An ice cream dispenser as specified in claim 8 including stop means for limiting reciprocal movement of said plunger means through said chamber of said barrel means so that said chamber extends to both sides of said piston means when said plunger means abuts said stop means, and said breech of said barrel means opens through one side of said barrel means and into that portion of said chamber thereof to the opposite side of said piston means from the side thereof fronting toward the open muzzle end of said chamber of said barrel means.

11. An ice cream dispenser as specified in either of claims 1, 2, 3, 4, 8, or 5 wherein said detainment means includes adjustable spring means for holding one end of a stick.

* * * * *